US012615495B2

(12) United States Patent (10) Patent No.: US 12,615,495 B2
Raofi (45) Date of Patent: Apr. 28, 2026

(54) SYSTEMS AND METHODS FOR WIRELESS COMMUNICATION IN RIDE ATTRACTIONS

(71) Applicant: Universal City Studios LLC, Universal City, CA (US)

(72) Inventor: Mo Raofi, Los Angeles, CA (US)

(73) Assignee: Universal City Studios LLC, Universal City, CA (US)

( * ) Notice: Subject to any disclaimer, the term of this patent is extended or adjusted under 35 U.S.C. 154(b) by 315 days.

(21) Appl. No.: 17/857,746

(22) Filed: Jul. 5, 2022

(65) Prior Publication Data

US 2023/0345215 A1 Oct. 26, 2023

Related U.S. Application Data

(60) Provisional application No. 63/334,675, filed on Apr. 26, 2022.

(51) Int. Cl.
*H04W 4/38* (2018.01)
*A63G 31/00* (2006.01)
*A63J 19/00* (2006.01)

(52) U.S. Cl.
CPC .............. *H04W 4/38* (2018.02); *A63G 31/00* (2013.01); *A63J 19/006* (2013.01)

(58) Field of Classification Search
None
See application file for complete search history.

(56) References Cited

U.S. PATENT DOCUMENTS

| | | | |
|---|---|---|---|
| 8,132,513 B2 | 3/2012 | Crawford et al. | |
| 2007/0106484 A1* | 5/2007 | Sweatman | A63G 7/00 701/1 |
| 2017/0293016 A1* | 10/2017 | McCloskey | G01S 13/08 |
| 2018/0162428 A1* | 6/2018 | Fortin | G08B 21/02 |
| 2019/0026946 A1* | 1/2019 | Jones | A63G 31/16 |
| 2019/0101638 A1* | 4/2019 | Vu | G01S 7/006 |
| 2019/0388793 A1 | 12/2019 | McVeen et al. | |
| 2020/0098190 A1* | 3/2020 | Goergen | A63G 7/00 |
| 2020/0236461 A1 | 7/2020 | Hall et al. | |

(Continued)

FOREIGN PATENT DOCUMENTS

CA 3129322 A1 8/2020

OTHER PUBLICATIONS

PCT/US2023/019921 International Search Report and Written Opinion mailed Aug. 30, 2023.

(Continued)

*Primary Examiner* — Wade Miles
*Assistant Examiner* — Jerrod Irvin Davis
(74) *Attorney, Agent, or Firm* — Fletcher Yoder, P.C.

(57) ABSTRACT

A system includes an attraction vehicle in an attraction. The attraction vehicle includes one or more sensors configured to measure one or more parameters pertaining to the attraction. The system also includes a network interface configured to transmit information related to the one or more parameters wirelessly using outgoing signals in a first high-frequency band and to receive incoming information at the attraction vehicle wirelessly using incoming signals using a second high-frequency band. The system also includes a controller configured to operate the attraction vehicle based at least in part on the incoming information.

20 Claims, 5 Drawing Sheets

(56) References Cited

U.S. PATENT DOCUMENTS

2020/0338462 A1    10/2020 Dagley
2022/0129649 A1*    4/2022 Friedberger ........... A63G 21/18

OTHER PUBLICATIONS

Edward Chester, "4.6Gbps Wi-Fi: How 60GHz wireless works—and should you use it?", Ars Technica, https://arstechnica.com/gadgets/2016/12/802-11ad-wifi-guide-review/, Dec. 15, 2016, accessed on Oct. 11, 2021, pp. 1-6.
"60GHz Wireless Networks—Fast 60GHz V-Band Wireless", https://www.60ghz-wireless.com, Jul. 3, 2019, accessed on Oct. 11, 2021, pp. 1-41.
"802.11ad vs 802.11ay-Difference between 802.11ad and 802.11ay", RF Wireless World, https://www.rfwireless-world.com/Terminology/WLAN-802-11ad-versus-802-11ay.html, accessed on Oct. 5, 2021, pp. 1-5.
"802.11ay wireless technology: Next-gen 60GHz WiFi", CableFree, https://www.cablefree.net/wirelesstechnology/wireless-lan/ieee802-11ay/, accessed on Oct. 5, 2021, pp. 1-4.
Cambium Networks, "802.11ay Emerges as the New Standard for 60 GHz Wi-Fi," May 2020, https://www.cambiumnetworks.com/wp-content/uploads/2020/05/80211ay-emerges-as-the-new-standard-for-60-GHz-Wi-Fi.pdf, accessed on Oct. 5, 2021, 1 page.
Robert Niles, "Bad WiFi connections are badnews parksnews for theme parks," Orange County Register, Jul. 10, 2018, https://www.ocregister.com/2018/07/10/bad-wifi-connections-are-bad-news-for-theme-parks/, accessed on Oct. 11, 2021, pp. 1-5.
IgniteNet, "MetroLinq™ 60GHz Wireless PTP/PTMP", https://www.ignitenet.com/technology/metrolinq/, accessed on Oct. 11, 2021, pp. 1-10.
"V Band 60Ghz Unlicensed Point to Point links", https://www.digitalairwireless.com/articles/blog/v-band-60ghz-unlicensed-point-to-point-links, accessed on Oct. 11, 2021, pp. 1-4.
Hugo Martin, "Why theme parks are spending millions to give guests free Wi-Fi," Los Angeles Times, https://www.latimes.com/business/la-fi-theme-park-wifi-20180720-story.html, Jul. 20, 2018, accessed on Oct. 11, 2021, pp. 1-11.
DeepBlue, A Comcast Business Company, "Case Study: Cedar Fair Kings Island WiFi Solution", https://www.deepbluecommunications.com/case-study/cedar-fair-kings-island/, accessed on Oct. 11, 2021, pp. 1-2.

* cited by examiner

100

102
ELECTRONIC DEVICE

104
CONTROLLER

106
PROCESSOR

108
MEMORY

110
DISPLAY

112
DAQ SYSTEM

114
WIRELESS COMMUNICATION 116
3D MODELING ENGINE

120
SENSOR NETWORK

122
UV SENSORS

124
IR SENSORS

126
VIBRATION SENSORS

128
IMAGING SENSORS

130
AUDIO SENSORS

132
BIOMETRIC SENSORS

134
POSITIONING SENSORS

136
ORIENTATION SENSORS

138
WEB DATA

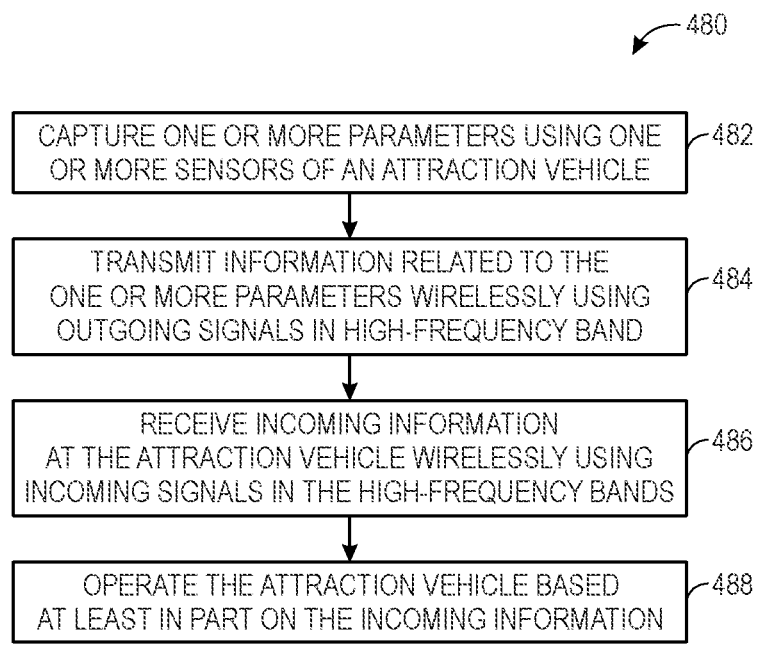

┌─────────────────────────────────────────────┐
│  CAPTURE ONE OR MORE PARAMETERS USING ONE     │── 482
│  OR MORE SENSORS OF AN ATTRACTION VEHICLE     │
└─────────────────────────────────────────────┘
                      │
                      ▼
┌─────────────────────────────────────────────┐
│  TRANSMIT INFORMATION RELATED TO THE          │
│  ONE OR MORE PARAMETERS WIRELESSLY USING      │── 484
│  OUTGOING SIGNALS IN HIGH-FREQUENCY BAND      │
└─────────────────────────────────────────────┘
                      │
                      ▼
┌─────────────────────────────────────────────┐
│  RECEIVE INCOMING INFORMATION                 │
│  AT THE ATTRACTION VEHICLE WIRELESSLY USING   │── 486
│  INCOMING SIGNALS IN THE HIGH-FREQUENCY BANDS │
└─────────────────────────────────────────────┘
                      │
                      ▼
┌─────────────────────────────────────────────┐
│  OPERATE THE ATTRACTION VEHICLE BASED         │── 488
│  AT LEAST IN PART ON THE INCOMING INFORMATION │
└─────────────────────────────────────────────┘

┌─────────────────────────────────────────────┐
│  RECEIVE INFORMATION                          │
│  FROM ONE OR MORE ATTRACTION                  │── 602
│  VEHICLES USING HIGH-FREQUENCY BAND           │
└─────────────────────────────────────────────┘
                      │
                      ▼
┌─────────────────────────────────────────────┐
│  CONTROL ONE OR                               │── 604
│  MORE OBJECTS USING THE RECEIVED INFORMATION  │
└─────────────────────────────────────────────┘

SYSTEMS AND METHODS FOR WIRELESS COMMUNICATION IN RIDE ATTRACTIONS

CROSS-REFERENCE TO RELATED APPLICATIONS

This application claims priority to U.S. Provisional Application No. 63/334,675, entitled "SYSTEMS AND METHODS FOR WIRELESS COMMUNICATION IN RIDE ATTRACTIONS," filed Apr. 26, 2022, the disclosure of which is incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Amusement parks and other entertainment venues contain experiences (e.g., ride vehicle experiences, animated figures (e.g., robotic characters), scenes, attractions, and the like) to entertain park guests. As the experiences become more technologically advanced and complex, the components within the experience may benefit from robust monitoring and synchronization using wireless communication. However, within the confines of the experiences, the wireless communication mechanism may experience interference when using traditional wireless communication techniques that are also available to consumers. Additionally, multiple locations (e.g., scenes) may transmit information for that specific location. However, wireless signals intended for use with a respective location may inadvertently interfere and/or invoke actions in other locations or vice versa.

BRIEF DESCRIPTION

Certain embodiments commensurate in scope with the originally claimed subject matter are summarized below. These embodiments are not intended to limit the scope of the disclosure, but rather, these embodiments are intended only to provide a brief summary of certain disclosed embodiments. Indeed, the present disclosure may encompass a variety of forms that may be similar to or different from the embodiments set forth below.

In an embodiment, a system includes an attraction vehicle in an attraction. The attraction vehicle includes one or more sensors configured to measure one or more parameters pertaining to the attraction. The system also includes a network interface configured to transmit information related to the one or more parameters wirelessly using outgoing signals in a first high-frequency band and to receive incoming information at the attraction vehicle wirelessly using incoming signals using a second high-frequency band. The system also includes a controller configured to operate the attraction vehicle based at least in part on the incoming information.

In an embodiment, a system includes a network interface configured to receive and transmit high-speed signals in a high-frequency band from an attraction vehicle in an attraction. The system also includes one or more processors configured to control one or more objects in the attraction by transmitting a control signal based at least in part on the signals transmitted from the attraction vehicle.

In an embodiment, a method includes measuring one or more parameters of operation of an attraction vehicle travelling within an attraction using one or more sensors on the attraction vehicle. The method also includes transmitting outgoing information from the attraction vehicle to a network of access points. The outgoing information is related to the one or more parameters and is transmitted wirelessly using outgoing signals in a first high-frequency band. The method also includes receiving incoming information at the attraction vehicle wirelessly using incoming signals using a second high-frequency band. The incoming information is based at least in part on signals from another attraction vehicle in the attraction that are transmitted wirelessly to the network of access points. Furthermore, the method includes operating the attraction vehicle based at least in part on the incoming information and the one or more parameters.

DRAWINGS

These and other features, aspects, and advantages of the present invention will become better understood when the following detailed description is read with reference to the accompanying drawings in which like characters represent like parts throughout the drawings, wherein.

Figure 1:
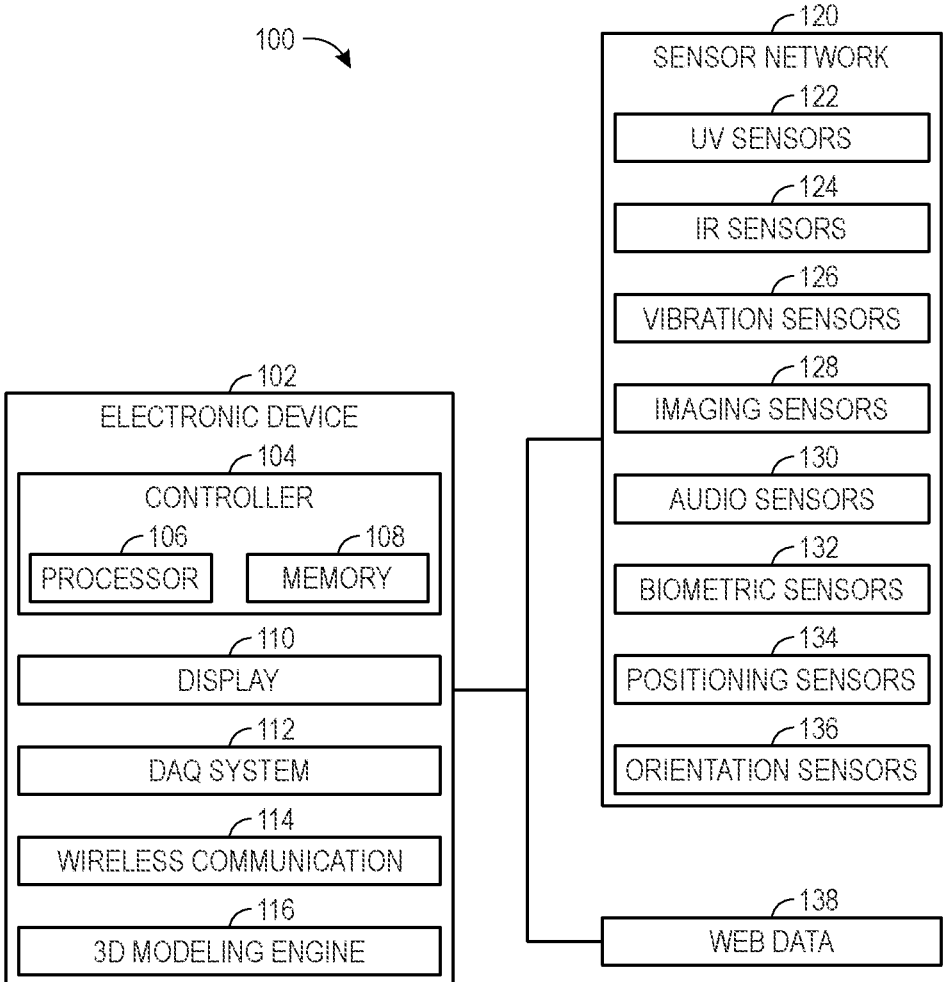
FIG. 1 is a block diagram of a system including a sensor network and one or more electronic devices, in accordance with an embodiment of the present disclosure.

FIG. 6 is a flow diagram of a process utilizing wireless communications of the system of FIG. 1 using high-frequency bands from the perspective of an attraction vehicle, in accordance with an embodiment of the present disclosure; and FIG. 7 is a flow diagram of a process utilizing wireless communications of the system of FIG. 1 using high-frequency bands from the perspective of a network of access points in the attraction, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

When introducing elements of various embodiments of the present disclosure, the articles "a," "an," and "the" are intended to mean there are one or more of the elements. The terms "comprising," "including," and "having" are intended to be inclusive and mean that there may be additional elements other than the listed elements. Additionally, it should be understood that references to "an embodiment" of the present disclosure are not intended to be interpreted as excluding the existence of additional embodiments that also include recited features. Furthermore, the word "or" is intended to be an inclusive term. For example, unless explicitly stated otherwise, "A or B" is intended to mean A or B or both A and B.

Theme parks and other such entertainment venues are becoming increasingly popular. Further, immersive experiences within such entertainment venues are in high demand. To provide new and exciting experiences/attractions ride experiences and scenes have become increasingly complex. These scenes may include visual shows including live action, animated figures, electronic-display-based imagery, and the like. These scenes may also involve integration of lighting, sound, movement, interactive elements, visual media, and so on. Accordingly, the components within the attraction may benefit from monitoring using wireless signals. This monitoring may be used to initiate or synchronize action in the scenes based on a moving vehicle. The moving vehicle may be a ride vehicle on which guests ride, drones, robots, or other vehicles that may move about an attraction. Furthermore, the monitoring may be used for a ride safety system that includes a programmable logic controller (PLC) to use data from the wireless signals to turn certain tags on or off depending on the signals. Additionally or alternatively, the monitoring may include watchdog software or hardware to track positioning of moving vehicles in the experience to make sure that vehicles do not collide in the experience. The position tracking may track the moving vehicles in two or three dimensions. The position tracking may also include tracking rotation of the moving vehicles. The position tracking may be used to control shell doors between scenes to block sounds between scenes. For instance, the shell door may open when the tracked location approaches the shell door and may close once the tracked location has passed a certain distance away from the shell door.

In the ride experience setting, wireless communication may be subject to relatively large amounts of interference in widely available consumer frequency bands (e.g., 2.4 GHz and 5.0 GHz) due to the proliferation of consumer devices operating in those frequency bands. Additionally, these frequency bands are available to consumers due to relatively robust ability to penetrate objects (e.g., walls, etc.) and to be broadcast over relatively large distances (e.g., more than 800 feet). However, the ability to penetrate objects may cause wireless signals to bleed between scenes in the experience. Additionally, the relatively large distances covered by consumer frequency bands may cause bleed between scenes as scenes may be considerably smaller than the broadcast range of devices using the consumer frequency bands. To mitigate these issues, ride experiences may use relatively high frequency bands (e.g., 60-80 GHz, outside of and above the 5 GHz consumer bands, etc.) that are not as suitable for consumer devices due to extremely short transmission lengths compared to common consumer wireless bands that are relatively low (e.g., 2.4 or 5 GHz). Specifically, the short transmission lengths may be due to the relatively high frequency signal's particular susceptibility to dropoffs due to elevated moisture and/or oxygen (02) absorption. Specifically, at such high frequencies (e.g., greater than 50 GHz), atmospheric absorption is much greater than at the lower rates (e.g., less than 10 GHz). For instance, signals using a 60 GHz frequency band may have up to 98% of its transmitted energy absorbed by atmospheric oxygen. The absorption rates may be further impacted by moisture levels in the air. For instance, in regions with higher heavier rain, the transmission distances are even more greatly reduced. Regardless of deployed location, the high frequency wireless signals may have short transmission distances. Additionally, the high frequency wireless signals may require line-of-sight (LoS) between transmitters and receivers since high frequency wireless signals cannot penetrate walls efficiently. The limited range and LoS requirements may limit connectivity in some respects, but the limited range and LoS requirements also provide a convenient mechanism for bounding regions where the wireless communications are to occur.

For instance, in certain buildings, the walls, the ceiling, and/or the floor may function like a faraday cage to block out wireless communication signals from outside of the building. This blockage may work to block transmissions to and from consumer devices. This blockage may be more severe for signals having higher frequencies (e.g., 60-80 GHz). As such, an attraction may be placed in such a structure to reduce noise in the high frequency ranges relative to consumer frequencies of 2.4 GHz and 5 GHz. This may be used to virtually isolate the attraction vehicles from noise outside of the attraction. Furthermore, walls in the structure may be used to isolate wireless communications to and from the attraction vehicles to keep them from interfering with each other.

With the foregoing in mind, FIG. 1 is a block diagram of a system 100 in accordance with the present disclosure. The system 100 may be a wireless communication system used to wirelessly communicate in a theme park attraction. As illustrated, the system 100 includes an electronic device 102, which may be in the form of any suitable electronic computing device, such as a computer, a laptop, a personal computer, server, mobile computing device, a smartphone, a tablet, a wearable device, or any other computing device. The electronic device 102 may include a controller 104 that includes one or more processors 106. The controller 104 of the electronic device 102 may also include one or more memory and/or storage devices 108. The one or more processors 106 may include a microprocessor, a central processing unit, a graphics processing unit, a general processor, a special-purpose processor, a programmable logic device (e.g., a field-programmable gate array or an application-specific integrated circuit), a programmable logic controller, another processor, or any combination thereof. For instance, the one or more processors 106 may include one or more reduced instruction set (RISC) processors, such as an ARM processor. The one or more processors 106 may execute instructions stored in the one or more memory and/or storage devices 108 to perform operations related to the data transmitted to and/or from an attraction vehicle. In some embodiments, the one or more processors 106 may implement, may be, and/or may include a controller, such as a programmable logic controller (PLC), a proportional-integral-derivative (PID) controller, or other suitable controller. For instance, the controller may be attached to the rest of the electronic device 102 as a chip or expansion card using corresponding connection types.

The one or more memory devices 108 may store information such as control software, look up tables, configuration data, sensor data, and so on. In some embodiments, the one or more processors 106 and/or the one or more memory devices 108 may be external to the controller 104 and/or the electronic device 102. The one or more memory devices 108 may include a tangible, non-transitory, machine-readable-medium, such as a volatile memory (e.g., a random-access memory (RAM)) and/or a nonvolatile memory (e.g., a read-only memory (ROM)). The one or more memory devices 108 may store a variety of information and may be used for various purposes. For example, the one or more memory devices 108 may store machine-readable and/or processor-executable instructions (e.g., firmware or software) for the one or more processors 106 to execute, such as instructions for determining a likelihood that an individual's future income and/or expenditure may change and adjusting the individual's financial planning accordingly. The one or more memory devices 108 may include one or more storage devices (e.g., nonvolatile storage devices) that may include read-only memory (ROM), flash memory, a hard drive, or any other suitable optical, magnetic, or solid-state storage medium, or a combination thereof.

In some embodiments, the electronic device 102 may also include an electronic display 110 that enables graphical and/or visual output to be displayed to a user. The electronic display 110 may use any suitable display technology, and may include an electroluminescent (ELD) display, liquid crystal (LCD) display, light-emitting diode (LED) display, organic LED (OLED) display, active-matrix OLED display, plasma display panel (PDP), quantum dot LED (QLED) display, and so on.

As illustrated, the electronic device 102 may include a data acquisition system (DAQ) 112 to send and receive information to and from a sensor network 120 of electronic sensors. For example, the electronic device 102 may include a communication interface that enables the controller 104 to communicate with servers and/or other computing resources of the sensor network 120 via a communication mechanism. For instance, the communication mechanism may include a wireless communication system that includes one or more antennas and one or more transceivers to send and receive data over high-speed wireless signal (e.g., between 60 GHz and 80 GHz). In some embodiments, the wireless communication system may be used to communicate over networks (e.g., a mobile communication network, a WiFi network, local area network (LAN), wide area network (WAN), the Internet, and the like) in addition to the high-speed wireless signals. In some cases, at least a portion of the information received from the sensor network 120 may be downloaded and stored on the memory or storage devices 108 of the electronic device 102. The sensor network 120 may include ultraviolet sensors 122, infrared sensors 124, vibration sensors 126, imaging sensors 128, audio sensors 130, biometric sensors 132, positioning (e.g., global positioning system and/or motion sensors) sensors 134, orientation (e.g., an accelerometer and/or a gyroscope) sensors 136, and so on. While the preceding collection of sensors are illustrated in FIG. 1, it should be noted that any other appropriate sensor, such as an accelerometer, a speed sensor, a torque sensor, a pressure sensor, a humidity sensor, an x-ray sensor, and so on may be employed in the system 100. In some embodiments, at least a portion of the sensor network 120 may be located on an attraction vehicle to determine information about the vehicle, the passengers, a direction/speed of travel of the vehicle, and other information. Furthermore, the attraction vehicle may have an instance of the electronic device 102 on the attraction vehicle that utilizes a wireless communication system 114 to communicate with another instance of the electronic device 102 (e.g., an attraction control computing device/server). In some embodiments, the computing device 102 on the attraction vehicle may include fewer components than the illustrated computing device 102 and may include part or all of the sensor network 120.

The sensor network 120 may enable the system 100 to collect and/or share an expansive amount of data regarding an amusement park attraction, such that the system 100 may obtain a fine-grain view of the various aspects of and components within the system 100. For example, positioning sensors, and orientation (e.g., accelerometer and/or gyroscope) sensors may be used to determine where ride vehicles are and what directions they are facing. For instance, the direction of travel and the direction which the seats are facing may be different and tracked separately. The location may be used to open and shut doors and/or generally prevent collisions between the vehicle and other objects, such as doors, walls, and/or moving objects (e.g., other vehicles). The location may also be used to initiate scenes based on a vehicle entering a scene or resetting a scene upon a vehicle leaving the scene. The positioning sensors may be used to make sure that the vehicle is viewing the proper location within a scene at the proper time. Additionally or alternatively, an infrared sensor 124 may detect whether the wheels or motor of a ride vehicle are emitting heat beyond a heat threshold and, if so, may trigger a warning (e.g., via the controller 104) to technical operators, disable the ride vehicle, or take any other appropriate action. The sensor network 120 may also enable the system 100 to address more qualitative issues in an amusement park attraction. For example, a lightbulb of a set of lightbulbs may burn out during a show or scene, negatively impacting the quality of a user's experience. However, if a camera or other imaging sensor (e.g., 128) detects a difference (e.g., a deviation from a predetermined profile) in the lighting of the scene, the electronic device 102 may cause the brightness or direction of other lightbulbs in the set of lightbulbs to adjust to compensate for the malfunctioning lightbulb. Further, the sensor network 120 may enable the system 100 to detect qualitative deviations such as a guest being in an area that the guest is not expected to be in. Upon making this determination, the system 100 may alert a technical operator or take other corrective action (e.g., stopping or pausing operation of the experience).

In addition to the sensor network 120, the DAQ 112 may collect web data 138 using software applications such as web crawlers to obtain information regarding anomalies or other issues within an attraction. For example, if a scene experiences an issue that may not be easily detected by sensors (e.g., an animated character's wig falls off or otherwise experiences a costume malfunction), a guest may notice the issue and post about the issue on social media. The DAQ 112 may detect, via the web crawler, the social media post and may trigger an alert. The attraction vehicle or scene may be adjusted using this information. For instance, the scene/attraction vehicle may incorporate real-time and/or near-real-time data (e.g., video captured from another location).

Figure 2:
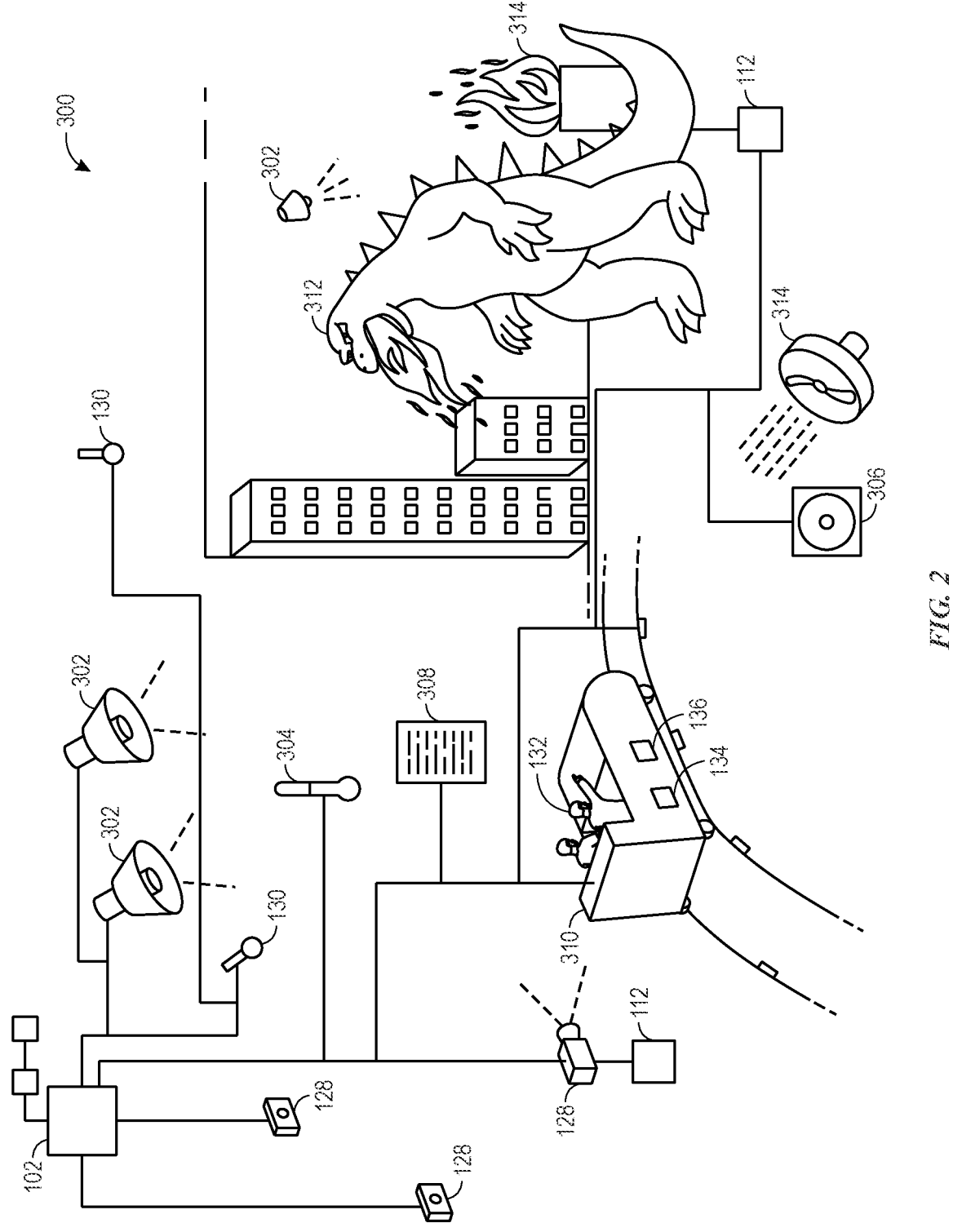
FIG. 2 is a diagram of an experience/attraction in which the system of FIG. 1 may be utilized, in accordance with an embodiment of the present disclosure.

FIG. 2 illustrates an experience 300 in which the system 100 may be utilized, according to an embodiment of the present disclosure. The experience may feature a ride vehicle 310 equipped with a positioning sensor 134 and an orientation sensor 136, an animated FIG. 312, environmental components 314 (e.g., a fan to simulate wind blowing on the guests, a fire, etc.), audio equipment 306, set lights 302, an audio sensor 130, a temperature sensor 304, imaging sensors 128 (e.g., a camera or other imaging sensors), various DAQs 112 to collect and share data (e.g., at least partially over a wireless network using high-speed signals) with other sensors and electronic devices 102 (e.g., communication hubs), and so on. The animated FIG. 312 may have multiple actuators to enable movement of the animated FIG. 312. The actuators of the animated FIG. 312 may be equipped with various sensors such as torque sensors, pressure sensors, temperatures sensors, gyroscopes, and so on. Additionally, or alternatively, the animated FIG. 312 may be presented at least partially using a video display. Additionally, the guests may wear biometric sensors 132 to permit monitoring of certain biometric data and/or to track movement of the users.

The experience 300 may undergo several cycles under normal operating conditions (e.g., as verified by a human technical operator) in order to obtain this data. For example, the cycling may include movement of a ride vehicle experience to determine proper triggering and response in order to verify that that not only is the ride vehicle experience operating as per the original creative intent but that the ride vehicle experience is responsive to the guest presence and/or precise location as intended. Upon collecting a sufficient amount of data, one or more electronic devices 102 may begin collecting, processing, and labelling the data. Based on the results of the processing and labelling phase, the one or more electronic devices 102 may determine and encode the parameters of a normally functioning experience.

The experience may be cycled repeatedly to enable learning additional aspects and parameters of the observed experience. For example, there may be a processing pass in which lighting color and intensity (e.g., detected via the imaging sensors 128 or the set lights 302) is learned and stored across the system 100. By sampling the experience 300 frame-by-frame over known time units, the system 100 may ascertain whether the set lights 302 are functioning properly to specification and are aimed as intended. The system 100 may detect anomalies such as flickering, outages, degradation or timing and triggering errors. Another processing pass may determine whether the animated FIG. 312, environmental components 314 and/or other action equipment are triggering properly, moving within expected motion profiles, and determine where and when motion is expected to appear under normal conditions.

Based on the obtained information, the one or more electronic devices 102 may generate profiles of the experience 300 based on the received sensor data. The profiles may include a baseline and a threshold indicating an expected range of the characteristics or aspects of the experience 300. For example, a profile where the equipment in the experience 300 (e.g., the set lights 302, audio equipment 306, environmental components 314, and animated FIG. 312) is determined to operate according to specification and expectation may be designated as an A profile. However, a profile where the equipment in the experience 300 is determined to operate outside of specification and expectation, the profile may be designated as a B profile, C profile, D profile, and so on.

As such, the one or more electronic devices 102 may determine whether the experience 300 is operating properly according to specification and expectation. Through the cycling and processing passes of the experience 300, profile thresholds may be determined outside of which the profile may receive a different designation, but within which a designation may remain even if deviation in the aspects and characteristics of the experience 300 are detected. For example, if during operation of the experience 300 the system 100 detects that the set lights 302 are dimmer than expected due to a technical error, the system 100 may determine this to be a deviation from the A profile, but not a deviation that exceeds the A profile threshold. Under these conditions, it may be determined that the experience 300 is operating properly. However, if the animated FIG. 312 experiences a technical issue that renders the animated FIG. 312 completely immobile, this may cause the profile of the experience 300 to be designated a B profile, C profile, and so on.

Depending on the parameters and boundaries designated by a user of the system 100, a B profile or C profile may be determined to be an improper operation of the experience 300, and thus, the one or more electronic devices 102 may determine that a corrective action is to be performed. The corrective action may include performing automated maintenance on malfunctioning equipment, such as sending a command causing the experience 300 to adjust current to a malfunctioning set light 302 outputting less brightness than expected or a command causing the experience 300 to adjust other equipment to account for malfunctioning equipment (e.g., adjusting the brightness of another set light 302 to compensate for the malfunctioning set light 302). The corrective action may also include sending an alert (e.g., to an alert panel 308) informing the technical operators of the malfunction. If the malfunction requires urgent action, the one or more electronic devices 102 may send an urgent alert to the technical operators and cause the experience 300 to stop or pause operation.

The one or more electronic devices 102 may learn to identify known and new anomalies as well as anticipate anomalies that may occur in the future. For example, if the one or more electronic devices 102 determine that the set lights 302 gradually experience a reduction in brightness prior to a bulb burning out, the one or more electronic devices 102 may trigger an alert to the technical operators if the one or more electronic devices 102 detects that a set light 302 has gradually experienced a reduction in brightness and may transmit in the alert an estimation of how long it may take for the bulb of the set light 302 to burn out. In this way, the system 100 may enable predictive maintenance within the experience 300 and may permit the technical operators to take corrective action prior to a malfunction, preserving the quality of the experience 300.

The system 100 may also be able to apply machine learning (ML) performed on the experience 300 to a different experience. The learned data from the experience 300 may be extrapolated and retargeted to another sufficiently similar experience by implementing a deep learning process known as transfer learning. Transfer learning allows for a sufficiently trained ML model to be repurposed and reused to make observations or predictions about a different but related problem set. For example, using the data learned about the operating characteristics of the set lights 302 in the experience 300, the ML engine 114 may be able to identify and anticipate issues that may be experienced by set lights in a different experience.

Figure 3:
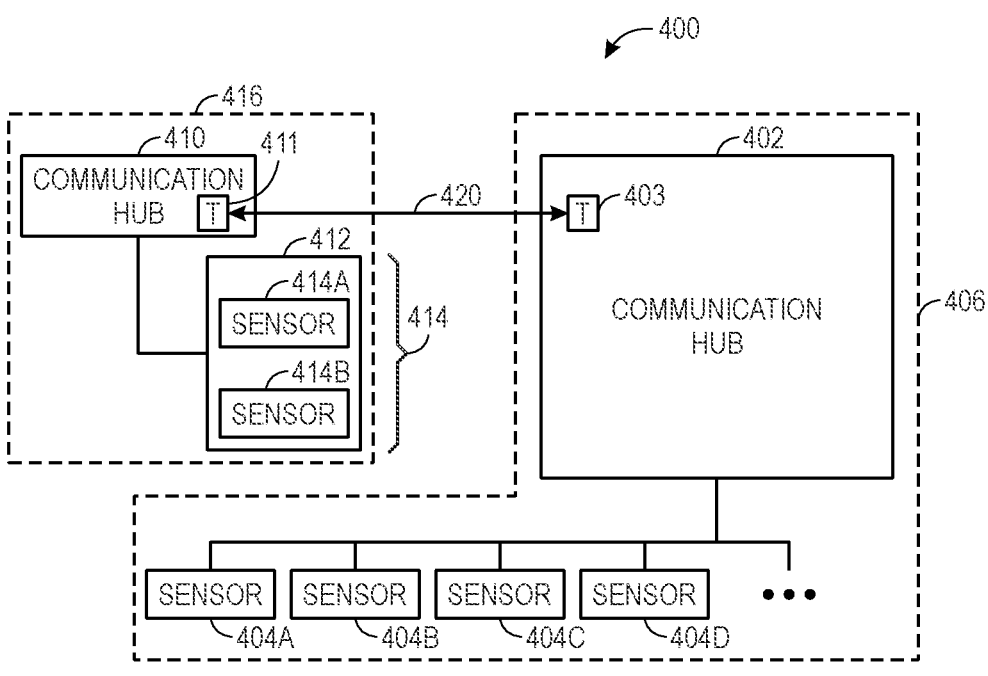
FIG. 3 is a block diagram illustrating a system of unlinked localized sensor networks of FIG. 1, in accordance with an embodiment of the present disclosure.

In certain embodiments, the experience 300 may utilize multiple localized sensor networks that are not linked together via a single network. FIG. 3 is a block diagram illustrating a system 400 of unlinked localized sensors networks, according to an embodiment of the present disclosure. Sensors 404A, 404B, 404C, and 404D (collectively referred to as the sensors 404) may be various sensors in the experience 300. These sensors may communicate data to a communication hub 402 (e.g., the electronic device 102). The communication hub 402 may analyze the sensor data from the sensors 404 and send commands to the sensors 404 or to other components within the experience 300. The communication hub 402 may include a transceiver 403 (or separate receiver and transmitter) to communicate with other devices. Additionally, the sensors 404 may communicate amongst themselves. The communication hub 402 and the sensors 404 may constitute a sensor network 406. Similarly, a communication hub 410 may receive signals (e.g., via a transceiver 411 or separate receiver and transmitter) from a device 412 (e.g., the animated FIG. 312 or the ride vehicle 310) having sensors 414A and 414B (collectively referred to as the sensors 414). The communication hub 410, the device 412, and the sensors 414 within the device 412 may constitute a sensor network 416. The communication 410 hub may communicate with the device 412 and the sensors 414. The communication hub 402 may communicate with the communication hub 410 using a wireless connection 420 via transceivers 403 and 411. The wireless connection 420 may include high-speed signals (e.g., between 60 GHz and 80 GHz) while the sensor networks 416 and 406 are distinct networks. For instance, the communication hub 402 may include/utilize an access point to provide the wireless connection 420 between the communication hub 402 and the communication hub 410.

Figure 4:
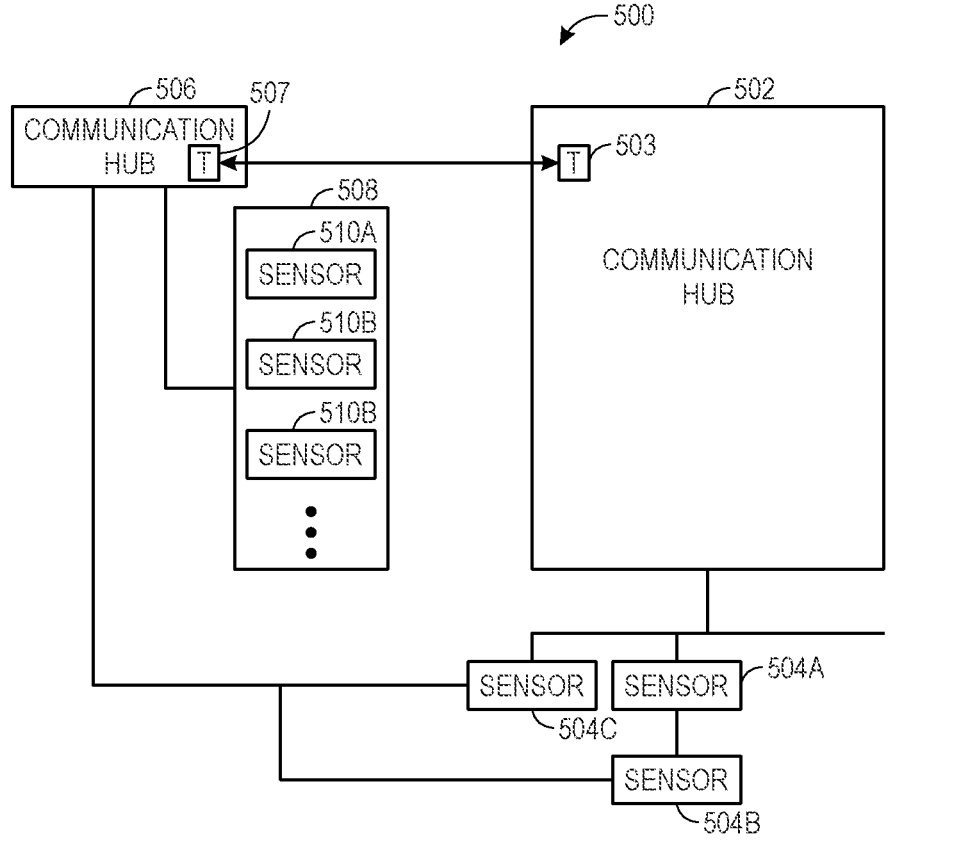
FIG. 4 is a block diagram illustrating a network of interconnected localized sensors and devices, in accordance with an embodiment of the present disclosure.

In contrast to FIG. 3, in certain embodiments the system 100 may utilize an interconnected system of localized sensor networks. As previously discussed, in certain embodiments the system 100 may utilize and report data to other systems within the experience 300. FIG. 4 is a block diagram illustrating a network 500 of interconnected localized sensors and devices, according to an embodiment of the present disclosure. In FIG. 4, a central communication hub 502 may collect data from and communicate with sensors 504A, 504B, and 504C (collectively referred to as the sensors 504). For instance, the central communication hub 502 may include a transceiver 503 (or separate receiver and transmitter) to communicate with other devices. The sensors 504 may also communicate with each other. Certain sensors (e.g., 504A) may act as smaller communication hubs for other sensors (e.g., 504B), collecting information and sending commands to the other sensors. A local communication hub 506 may also collect data from the sensors 504 as well as from a device 508 equipped with a sensor 510A, a sensor 501B, and a sensor 510C. In this way, the device 508 and the sensors 510 within the device 508 may communicate with each other and with the sensors 504. The local communication hub 506 may include one or more transceivers 507 (or separate receivers and transmitters) to communicate with other devices. For instance, the central communication hub 502 may also communicate with the local communication hub 506 via wired and/or wireless communication (e.g., WiFi, via a cellular network, and so on) using respective transceivers 503 and 507. For instance, the wireless communication may include high-speed signals (e.g., 60 GHz-80 GHz signals). While only one local communication hub 506 is shown, it should be understood that there may be any number of local communication hubs in the system 100. Further, a local communication hub may be assigned to an area of the experience 300, particular equipment of the experience 300 (e.g., the animated character 312), the vehicle, or a subsystem of particular equipment (e.g., a set of actuators within the animated character 312).

Utilizing the network 500, a parameter detected in one sensor (e.g., 504B) in the network 500 may be communicated to other sensors (e.g., 504A, 504C, 510) in the network 500 as well as to other equipment (e.g., the device 508) such as controllers in the animated figures 312 or doors, the environmental components 314, and so on. For example, if the vehicle connects to a certain communication hub/access point, the experience 300 or scene may initialize. Additionally or alternatively, if a rise in temperature above a threshold is detected by the temperature sensor 304, the temperature sensor 304 may communicate the rise in temperature over the network 500 to cause one or more fans to activate, to adjust a setting of a central air-conditioning unit, and/or to reduce the output of certain heat-producing elements within the experience 300 (e.g., flames).

Returning to FIG. 1, in certain embodiments, training data may be augmented with three-dimensional (3D) (e.g., via a 3D modeling engine 116) information about the experience 300 being observed. By informing the system 100 of the global positions of sensors in the sensor network 120 relative to known computer-aided or temporally changing 3D data, repositioning, removing, or adding additional sensors, devices, and other equipment may be permitted without retraining from certain observation angles. For example, given the pixel data of an image sensor 128 and knowledge of where particular pixels align with the 3D set, the image sensor 128 may be retrained from a new angle, shortening or eliminating the time normally required to add, remove, move or remount new image sensors. Thus, by using an interconnected network of sensors, devices, and equipment such as the network 500 depicted in FIG. 4 along with the transfer learning processes previously discussed and the 3D modeling engine 116, the system 100 may reduce or eliminate the time and/or processing power normally required in adding, removing, moving, and/or reconfiguring sensors, devices, and equipment.

Additionally, using the 3D modeling engine 116, the system 100 may be able to detect and correct certain positional errors of the equipment or sensors. For example, if the system 100 detects unexpected readings from a positioning sensor 134 and/or an orientation sensor 136, the system may determine that the vehicle is misaligned, and send feedback to the system 100 enabling the system 100 to correct the position of the vehicle.

Figure 5:
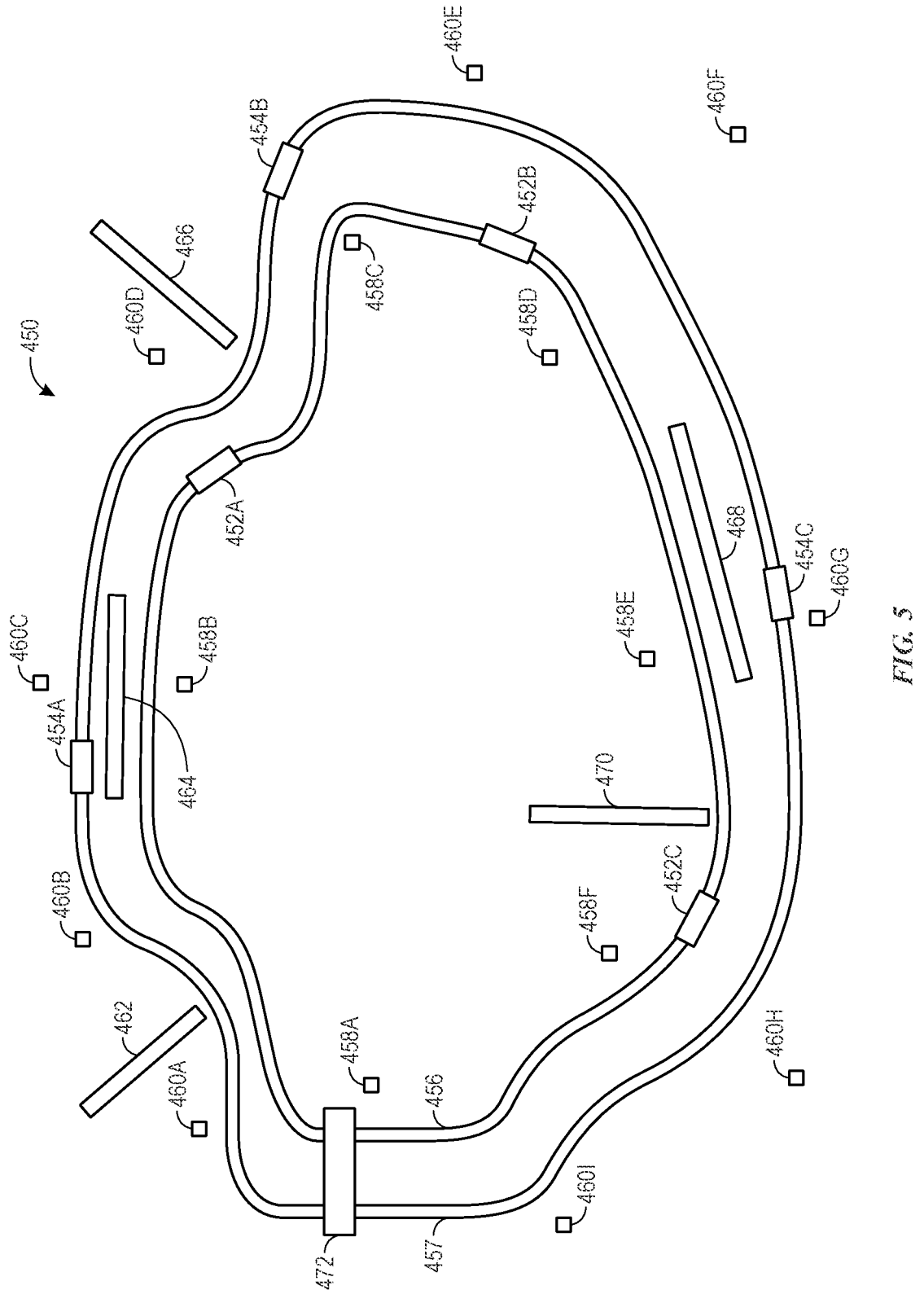
FIG. 5 is a graphical view of the attraction that includes multiple scenes or experiences within the attraction, in accordance with an embodiment of the present disclosure.

FIG. 5 is a graphical view of an attraction 450 that includes multiple scenes or experiences within the attraction. As illustrated, the attraction 450 includes a first group of vehicles 452A, 452B, and 452C (collectively referred to as vehicles 452) and a second group of vehicles 454A, 454B, and 454C (collectively referred to as vehicles 454). The vehicles 452 travel on a first track 456 of the attraction 450, and the vehicles 454 travel on a second track 457 of the attraction 450. Although two tracks are shown, some embodiments of the attraction 450 may have a different number of tracks, such as 1, 3, 4, or more tracks. Additionally or alternatively, some embodiments of the attraction 450 may be traversed without tracks. For instance, a rider may be able to at least partially control where the respective vehicle travels until an elapsed time has passed and the vehicle travels to a next location (e.g., a finish line).

As previously discussed, the vehicles 452 and 454 may transfer data to and from the vehicles 452 and 454 using high-speed wireless signals (e.g., 60 GHz, 80 GHz, or any frequency between). For instance, the vehicles 452 and/or 454 may connect to inner access points 458A, 458B, 458C, 458D, 458E, and 458F (collectively referred to as inner access points 458). Additionally or alternatively, the vehicles 452 and/or 454 may connect to outer access points 460A, 460B, 460C, 460D, 460E, 460F, 460G, 460H, and 4601 (collectively referred to as outer access points 460). Although the illustrated attraction has a different number of inner access points 458 and outer access points 460, some embodiments may include the same number of inner access points 458 as outer access points 460. Furthermore, in some embodiments, at least some access points may be located between the first track 456 and the second track 457. In some embodiments, the vehicles 452 may connect only to inner access points 458 while the vehicles 454 connect only to outer access points 460. To enforce using dedicated access points per track, the inner access points 458 may operate using a first frequency (e.g., 62 GHz) while the outer access points 460 may operate using a second frequency (e.g., 75 GHz).

In some locations, access points 458 and/or 460 may be within range of each other even with the limited range available when using high-frequency signals (e.g., 60 GHz or greater). To further reduce the likelihood of interference or crosstalk between access points, walls 462, 464, 466, 468, 470 and 472 may be strategically placed throughout the attraction. Additionally or alternatively, the locations for the access points may be planned relative to wall locations in the attraction. Furthermore, some scenes in the attraction may have a clamshell door between scenes through which the vehicles 452 and/or 454 may pass through when travelling through the attraction. In these embodiments, the computing device on the ride vehicle may transition from one access point to another access point as/after the doors close. Furthermore, the wireless signals from the vehicle to the access points may be used to control when the clamshell door is opened and when the clamshell door is closed.

FIG. 6 is a flow diagram of a process 480 utilizing wireless communications in high-frequency bands. As used herein, high-frequency bands are bands above 56.2 GHz, at and including 60 GHz, above 60 GHz, between 60 GHz and 80 GHz, or at and including 80 GHz. One or more sensors of the attraction vehicle captures one or more parameters (block 482). For example, the one or more parameters may include a location of the attraction vehicle, an orientation of the attraction vehicle, a speed of the attraction vehicle, proximity of other attraction vehicles, parameters in a scene of the attraction, and the like. A computing device/wireless transmitter of the attraction vehicle transmits information related to the one or more parameters wirelessly using outgoing signals in high-frequency bands (block 484). The computing device/wireless receiver of the attraction vehicle may also wirelessly receive incoming information in the high-frequency bands (block 486). In some embodiments, the transmitted information and the incoming information may utilize different high-frequency bands. Additionally or alternatively, a track on which the attraction vehicle is assigned, attached to, and/or traveling may correspond to a particular frequency, such that a first attraction vehicle on a first track transmits using a first high-frequency band and a second attraction vehicle on a second track transmits using a second high-frequency band that is different than the first high-frequency band. As previously discussed, the incoming and outgoing high-frequency bands may be different. For instance, the first attraction vehicle on the first track transmits using the first high-frequency band and receives using a third high-frequency band. Similarly, the second attraction vehicle on the second track transmits using the second high-frequency band and receives using a fourth high-frequency band. In some embodiments, the third high-frequency band is different than the fourth high-frequency band. In some embodiments, the first, second, third, and fourth high-frequency bands may be different from each other with no overlap of frequencies.

The attraction vehicle may operate based at least in part on the incoming information (block 488). For example, the attraction vehicle may change speed or stop based on the incoming information. For instance, the incoming information may indicate that an attraction vehicle ahead has stopped, that a clamshell door is malfunctioning, or that another malfunction or maintenance issue has occurred. Additionally or alternatively, the attraction vehicle may present information on its display based at least in part on the incoming information.

FIG. 7 is a flow diagram of a process 600 for a controller computing device and/or network to wirelessly communicate with the attraction vehicle. The controller computing device may be a computing device similar to the electronic device 102 discussed previously. The controller computing device/network receives information from one or more attraction vehicles using signals in a high-frequency band (block 602). For example, the information may include a location of an attraction vehicle, an orientation of an attraction vehicle, a speed of an attraction vehicle, proximity between attraction vehicles, parameters in a scene of the attraction, other sensor values, and the like. Signals from different attraction vehicles may be received using different high-frequency bands. For example, attraction vehicles on a first track may use a first high-frequency band while attraction vehicles on a second track may use a second high-frequency band. The computing device/network may control one or more objects using the received information (block 604). For example, the computing device/network may utilize an access point to send signals in one of the high-frequency bands to control a speed of/stop movement of an attraction vehicle, to change orientation of at least a portion (e.g., the seats) of the attraction vehicle, to control aspects (e.g., video, lighting, animated sequences, etc.) in the attraction vehicle or of a scene, and the like. The communication to the attraction vehicle may utilize a different frequency band than is used for communication from the attraction vehicle. Additionally or alternatively, the computing device/network may control one or more objects using 2.4 GHz Wi-Fi, 5 GHz Wi-Fi, Bluetooth, IEEE 802.15.4, or other wireless conventional standards. Furthermore, in some embodiments, the computing device/network may control one or more objects using wired connections, such as Ethernet. For example, such conventional wireless or wired connections may be used to control objects with stationary locations, such as video displays, animated objects, lights, doors, and the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. An attraction system, comprising:
an attraction vehicle comprising:

one or more sensors configured to measure one or more parameters pertaining to the attraction system;

a network interface communicatively coupled to the one or more sensors and configured to:

transmit information related to the one or more parameters wirelessly using outgoing signals in a first high-frequency band to a plurality of access points by transitioning between access points of the plurality of access points when transitioning between scenes of an attraction through which the attraction vehicle traverses by closing a door or causing the attraction vehicle to travel behind a wall to disconnect from a previous access point of the plurality of access points; and receive incoming information at the attraction vehicle wirelessly using incoming signals using a second high-frequency band, wherein the first and second high-frequency bands use frequencies higher than 60 GHz to exchange data between the attraction vehicle and one or more wireless electronic devices; and a controller configured to operate the attraction vehicle based at least in part on the incoming information.

2. The attraction system of claim 1, wherein the first high-frequency band is different from the second high-frequency band.

3. The attraction system of claim 1, wherein the first high-frequency band and the second high-frequency band at least partially overlap.

4. The attraction system of claim 1, comprising a plurality of tracks, and the frequencies of the first high-frequency band and the second high-frequency band are based at least in part on which track of the plurality of tracks to which the attraction vehicle is assigned.

5. The attraction system of claim 1, wherein the one or more sensors comprises an orientation sensor, and the one or more parameters comprises an orientation of at least a portion of the attraction vehicle.

6. The attraction system of claim 5, wherein the orientation of the at least a portion of the attraction vehicle comprises an orientation of one or more seats of the attraction vehicle.

7. The attraction system of claim 6, wherein the orientation of the at least a portion of the attraction vehicle comprises a direction of travel tracked separately from the orientation of the one or more seats of the attraction vehicle.

8. The attraction system of claim 1, wherein the one or more sensors comprises a location sensor, and the one or more parameters comprises a location for the attraction vehicle.

9. The attraction system of claim 1, wherein the one or more sensors comprises a speedometer, and the one or more parameters comprises a speed for the attraction vehicle.

10. The attraction system of claim 1, wherein the one or more sensors comprises a proximity sensor, and the one or more parameters comprises a proximity of the attraction vehicle to objects in the attraction system.

11. The attraction system of claim 10, wherein the objects comprise doors in the attraction system or other attraction vehicles in the attraction system.

12. The attraction system of claim 1, wherein the incoming information comprises control signals that are based at least in part on the transmitted information related to the one or more parameters.

13. The attraction system of claim 12, wherein operating the attraction vehicle comprises stopping or slowing the attraction vehicle based on information from another attraction vehicle or another sensor in the attraction system.

14. An attraction system, comprising:

a network interface configured to receive and transmit high-speed signals in a high-frequency band from an attraction vehicle in an attraction to a plurality of access points by transitioning between access points of the plurality of access points when the attraction vehicle traverses through the attraction by causing a door to close or causing the attraction vehicle to travel behind a wall to disconnect from a previous access point of the plurality of access points, wherein the high-frequency band uses frequencies higher than 60 GHz to exchange data between the attraction vehicle and another wireless electronic device; and one or more processors configured to control one or more objects in the attraction by transmitting a control signal based at least in part on the high-speed signals transmitted from the attraction vehicle.

15. The attraction system of claim 14, wherein the one or more processors comprise a programmable logic controller (PLC) or a proportional-integral-derivative (PID) controller.

16. The attraction system of claim 14, wherein the high-frequency band comprises frequencies between 60 GHz and 80 GHz.

17. The attraction system of claim 14, wherein controlling the one or more objects comprises slowing or stopping or rotating another attraction vehicle in the attraction by sending the control signal to the other attraction vehicle via the high-frequency band.

18. The attraction system of claim 14, wherein controlling the one or more objects comprises slowing or stopping or rotating another attraction vehicle in the attraction by sending the control signal to the other attraction vehicle via an additional high-frequency band, the attraction vehicle traverses a first track in the attraction that corresponds to the high-frequency band, and the other attraction vehicle traverses a second track in the attraction that corresponds to the additional high-frequency band.

19. A method of attraction system operation, the method comprising:

measuring one or more parameters of operation of an attraction vehicle travelling within an attraction using one or more electronic sensors on the attraction vehicle;

transmitting, from a transmitter on the attraction vehicle, outgoing information from the attraction vehicle to a network comprising a plurality of access points by transitioning between access points when transitioning between scenes of the attraction system by closing a door or causing the attraction vehicle to travel behind a wall to disconnect from a previous access point of the plurality of access points, wherein the outgoing information is related to the one or more parameters and is transmitted wirelessly using outgoing signals in a first high-frequency band;

receiving, at a receiver of the attraction vehicle, incoming information at the attraction vehicle wirelessly using incoming signals using a second high-frequency band, wherein the incoming information is based at least in part on signals from another attraction vehicle in the attraction that are transmitted wirelessly to the network of access points, wherein the first and second high-frequency bands use frequencies higher than 60 GHz to exchange data between the attraction vehicle and one or more wireless electronic devices; and operating, using a controller, the attraction vehicle based at least in part on the incoming information and the one or more parameters.

20. The method of claim 19, wherein the second high-frequency band comprises frequencies between 60 GHz and 80 GHz.

\* \* \* \* \*